(12) United States Patent
Yun et al.

(10) Patent No.: US 11,086,877 B2
(45) Date of Patent: Aug. 10, 2021

(54) METHOD, SYSTEM, AND NON-TRANSITORY COMPUTER-READABLE RECORD MEDIUM FOR SEARCHING FOR NON-TEXT USING TEXT IN CONVERSATION

(71) Applicant: LINE Plus Corporation, Seongnam-si (KR)

(72) Inventors: Hey Young Yun, Seongnam-si (KR); Donghyun Kim, Seongnam-si (KR); Jong Youn Ahn, Seongnam-si (KR); Hyukjae Jang, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 13 days.

(21) Appl. No.: 16/508,929

(22) Filed: Jul. 11, 2019

(65) Prior Publication Data
US 2020/0042526 A1   Feb. 6, 2020

(30) Foreign Application Priority Data

Jul. 31, 2018   (KR) .................. 10-2018-0089561

(51) Int. Cl.
| | | |
|---|---|---|
| *G06F 16/2455* | (2019.01) | |
| *G06F 16/28* | (2019.01) | |
| *G06F 16/248* | (2019.01) | |
| *G06F 16/48* | (2019.01) | |
| *G06F 3/0484* | (2013.01) | |

(52) U.S. Cl.
CPC ...... *G06F 16/24564* (2019.01); *G06F 16/248* (2019.01); *G06F 16/285* (2019.01); *G06F 16/48* (2019.01); *G06F 3/04842* (2013.01)

(58) Field of Classification Search
CPC ............. G06F 16/24564; G06F 16/285; G06F 16/248; G06F 16/48; G06F 3/04842
See application file for complete search history.

(56) References Cited

U.S. PATENT DOCUMENTS

| | | | | |
|---|---|---|---|---|
| 2011/0093811 | A1* | 4/2011 | Park ..................... | G06F 3/0484 |
| | | | | 715/785 |
| 2017/0032470 | A1* | 2/2017 | Watanachote ....... | G06Q 10/067 |
| 2017/0300537 | A1* | 10/2017 | Kim ...................... | G06F 16/248 |
| 2017/0346777 | A1* | 11/2017 | Kim ...................... | G06F 3/0482 |
| 2018/0276202 | A1* | 9/2018 | Baek ..................... | H04L 51/04 |
| 2018/0367325 | A1* | 12/2018 | Jang ...................... | H04L 51/20 |

FOREIGN PATENT DOCUMENTS

KR    10-2002-0074304 A    9/2002

* cited by examiner

*Primary Examiner* — Thu V Huynh
(74) *Attorney, Agent, or Firm* — Harness, Dickey & Pierce, P.L.C.

(57) ABSTRACT

Provided are a method, a system, and a non-transitory computer-readable record medium for searching for a non-text using a text in chat content. The method including retrieving a chat message that includes text input as a keyword from chat content on a messenger, extracting non-text content from a chat section specified based on the retrieved chat message, and providing the extracted non-text content as a search result corresponding to the keyword.

18 Claims, 10 Drawing Sheets

METHOD, SYSTEM, AND NON-TRANSITORY COMPUTER-READABLE RECORD MEDIUM FOR SEARCHING FOR NON-TEXT USING TEXT IN CONVERSATION

CROSS-REFERENCE TO RELATED APPLICATION(S)

This U.S. non-provisional application claims the benefit of priority under 35 U.S.C. § 119 to Korean Patent Application No. 10-2018-0089561 filed on Jul. 31, 2018, in the Korean Intellectual Property Office (KIPO), the entire contents of which are incorporated herein by reference.

BACKGROUND

Field

One or more example embodiments relate to method, systems, and/or a non-transitory computer-readable medium for searching for content to be shared during a conversation.

Description of Related Art

A general communication tool, for example, an instant messenger, refers to software capable of transmitting and receiving messages or data in real time. A user may register a chat counterpart on a messenger, and may exchange messages with a counterpart included in a chat counterpart list in real time.

Such a messenger function is generally used not only in a personal computer (PC) but also in a mobile environment of a mobile communication terminal.

In general, a messenger supports a function that enables a variety of information, for example, a photo, a video, a file, a contact, a location, a schedule, a notification, and/or a vote to be shared among users through a chatroom.

SUMMARY

One or more example embodiments provide methods and/or systems that search for non-text content using a text in chat contents exchanged through an application.

One or more example embodiments also provide methods and/or systems that enable a user to search for content to be shared through an application by conducting a text search instead of directly scanning chat contents or a content list.

According to an aspect of at least one example embodiment, a method implemented by a computer system including at least one processor configured to execute computer-readable instructions included in a memory includes retrieving, by the at least one processor, a chat message that includes a text input as a keyword from chat contents on a messenger, extracting, by the at least one processor, non-text content from a chat section specified based on the retrieved chat message, and providing, by the at least one processor, the extracted non-text content as a search result corresponding to the keyword.

The extracting may include specifying at least a portion of the chat section including some previous and subsequent chats based on the retrieved chat message and extracting multimedia content from the specified chat section.

The extracting may include extracting a desired number of chats from at least one previous and subsequent chat based on the retrieved chat message and extracting multimedia content from the extracted number of chats.

The extracting may include extracting a desired number of chats exchanged during at least one unit time of previous or subsequent unit times based on time information of the retrieved chat message, and extracting multimedia content from the extracted number of chats.

The extracting may further include adjusting the unit time based on the number of chats exchanged during the unit time.

The providing may include providing the search result that includes the retrieved chat message and the extracted non-text content.

The providing may include classifying and providing the retrieved chat message and the extracted non-text content included in the search result, and classifying and providing the non-text content according to a content type thereof.

The providing may include providing the retrieved chat message and the non-text content included in the search result in a preview form.

The providing may further include directing to a chatroom that includes one or more contents including the extracted non-text content in response to a selection of the content included in the search result.

The directing may include displaying the chatroom at a location of the extracted non-text content or the chat message that is used as a criterion to extract the non-text content, through an automatic scroll.

According to an aspect of at least one example embodiment, there is provided a non-transitory computer-readable record medium storing instructions that, when executed by a computer including one or more processors, cause the computer to perform the method set forth in the foregoing.

According to an aspect of at least one example embodiment, a computer system including a memory, and at least one processor configured to connect to the memory and to execute computer-readable instructions included in the memory. The at least one processor is configured to retrieve a chat message that includes a text input as a keyword from chat contents on a messenger, extract non-text content from a chat section specified based on the retrieved chat message, and a search result provider configured to provide the extracted non-text content as a search result corresponding to the keyword.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
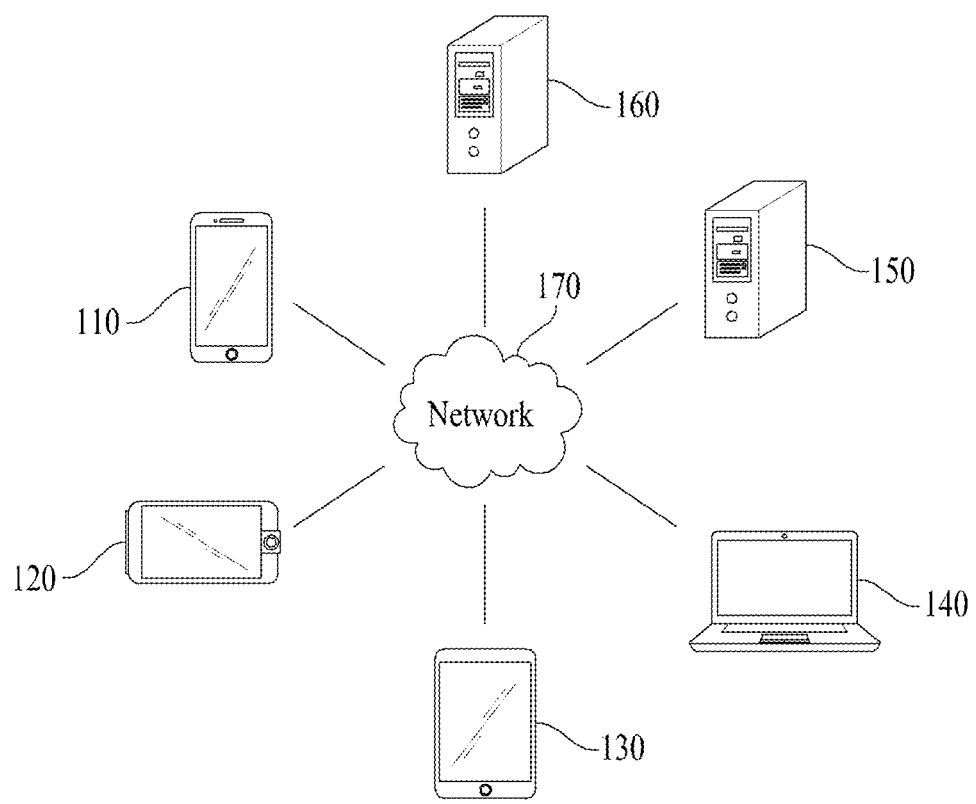
FIG. 1 illustrates an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable record media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable record media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable record media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to techniques for searching for shared content during a conversation, that is, a chat.

The example embodiments including the detailed disclosures may relate to searching for non-text content using a text in chat contents exchanged through an application, to achieve various advantages in terms of convenience, efficiency, and/or quality of service (QoS).

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer system. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, and an augmented reality (AR) device. For example, although FIG. 1 illustrates a shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, and a satellite network, which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and/or 140 over the network 170, and the server 160 may be a system that provides a second service to the plurality of electronic devices 110, 120, 130, and/or 140 over the network 170. For example, the server 150 may provide a service, for example, a messenger service, desired by a corresponding application as the first service to the plurality of electronic devices 110, 120, 130, and/or 140 through the application of the computer program installed and executed on the plurality of electronic devices 110, 120, 130, and/or 140. As another example, the server 160 may provide a service for distributing a file for installing and executing the application to the plurality of electronic devices 110, 120, 130, and/or 140 as the second service.

Figure 2:
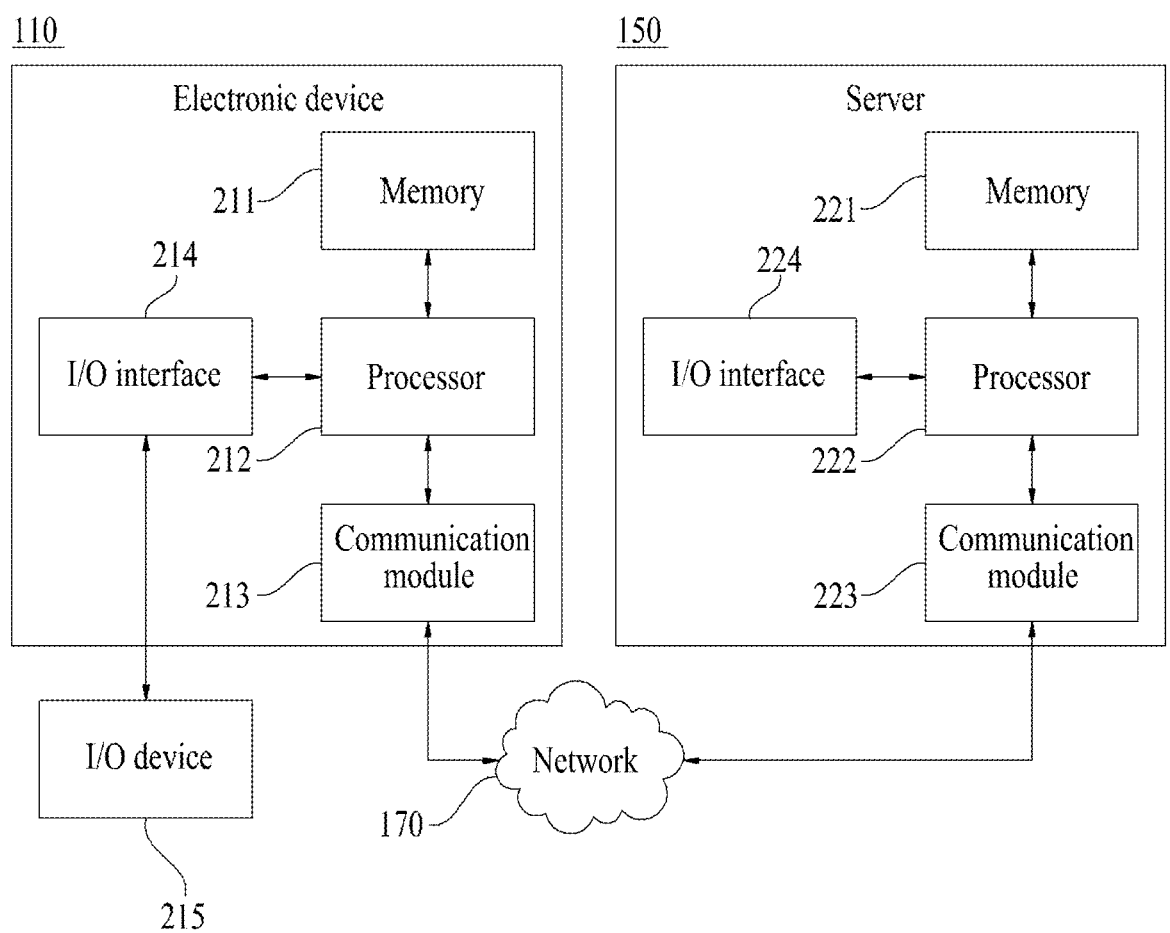
FIG. 2 illustrates an example of an electronic device and a server according to at least one example embodiment.

FIG. 2 is a block diagram illustrating an example of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, communication circuitry 213, and an input/output (I/O) interface 214, and the server 150 may include a memory 221, a processor 222, communication circuitry 223, and an I/O interface 224. The memory 211, 221 may include a permanent mass storage device (e.g., random access memory (RAM), a read only memory (ROM), a disk drive, a solid state drive (SSD), or a flash memory), as a non-transitory computer-readable record medium. The permanent mass storage device (e.g., ROM, SSD, flash memory, or disk drive) may be included in the electronic device 110 or the server 150 as a permanent storage device separate from the memory 211, 221. Also, an OS or at least one program code, (e.g., a code for a browser to be installed and executed on the electronic device 110 or an application to be installed and executed on the electronic device 110 to provide a specific service) may be stored in the memory 211, 221. Such software components may be loaded from another non-transitory computer-readable record medium separate from the memory 211, 221. The other non-transitory computer-readable record medium may include, for example, a floppy drive, a disk, a tape, a DVD/CD-ROM drive, or a memory card. According to other example embodiments, software components may be loaded to the memory 211, 221 through the communication circuitries 213, 223, respectively, instead of, or in addition to, the non-transitory computer-readable record medium. For example, at least one program may be loaded to the memory 211, 221 based on a computer program, for example, the application, installed by files provided over the network 170 from developers or a file distribution system (e.g., the server 160), which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication circuitry 213, 223 to the processor 212, 222. For example, the processor 212, 222 may be configured to execute received instructions in response to the program code stored in the storage device, such as the memory 211, 221.

The communication circuitry 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request created based on a program code stored in a storage device (e.g., the memory 211) to the server 150 over the network 170 under control of the communication circuitry 213. Conversely, a control signal, an instruction, content, a file, etc., provided under control of the processor 222 of the server 150 may be received at the electronic device 110 through the communication circuitry 213 of the electronic device 110 by going through the communication circuitry 223 and the network 170. For example, a control signal, an instruction, content, a file, etc., of the server 150 received through the communication circuitry 213 may be transferred to the processor 212 or the memory 211, and content, a file, etc., may be stored in a record medium further includable in the electronic device 110.

The I/O interface 214 may be a device used for interface with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a separate device connected to the electronic device 110. The I/O interface 224 of the server 150 may be a device for interface with an apparatus (not shown) for input or output that may be connected to the server 150 or included in the server 150. For example, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include the number of components greater or less than the number of components shown in FIG. 2. However, there is no need to illustrate in detail many components that are well known in the related art. For example, the electronic device 110 may include at least a portion of the I/O device 215, or may further include other components, for example, a transceiver, global positioning system (GPS) circuitry, a camera, a variety of sensors, a database (DB), and the like. For example, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, some example embodiments of methods and systems for searching for a non-context using a text in chat contents are described.

The application according to the example embodiments includes a search function of providing, as a search result, a chat message including a keyword in chat contents shared through the application in response to the keyword input from a user. The application may include a social media application that provides a social networking service, for example, a messenger and a timeline.

Although some example embodiments are described using the messenger as an example, it is provided as an example only. Features associated with example embodiments may apply various types of social media applications in addition to the messenger.

The messenger includes a search function of retrieving a chat message using a keyword input as a text. An existing search function uses a chat message including texts as a search target, however, excludes multimedia content, for example, a video and an image, from the search target.

To retrieve multimedia content, a user needs to directly scan chat contents or a content list.

For example, it is assumed that the user performs a process of retrieving an image E.

Figure 3:
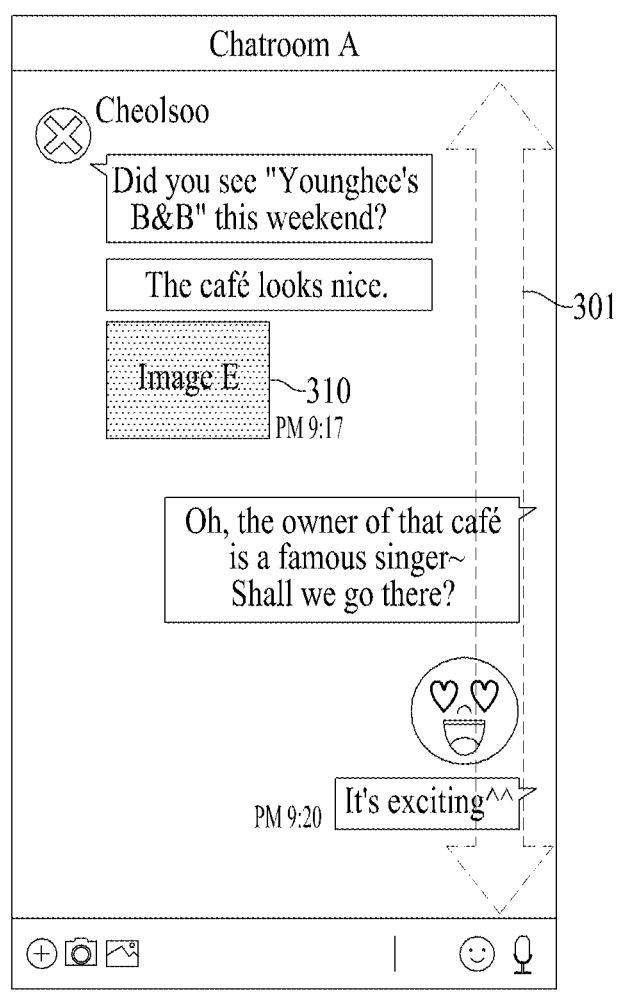
FIGS. 3 and 4 illustrate examples of a process of retrieving multimedia content shared on a messenger according to at least one example embodiment.

Referring to FIG. 3, the user needs to retrieve a shared image E 310 during a chat by entering a chatroom A 300 in which the image E 310 is shared and by scrolling the entire chat contents exchanged through the chatroom A 300 as indicated by an indicator 301 with arrow heads.

To retrieve the image E 310, the user needs to scan the entire chat contents of the chatroom A 300 and a relatively long search time is used accordingly. Unless the user remembers the chatroom A 300, a relatively large amount of time and great effort may be used for the user to retrieve the image E 310.

Figure 4:
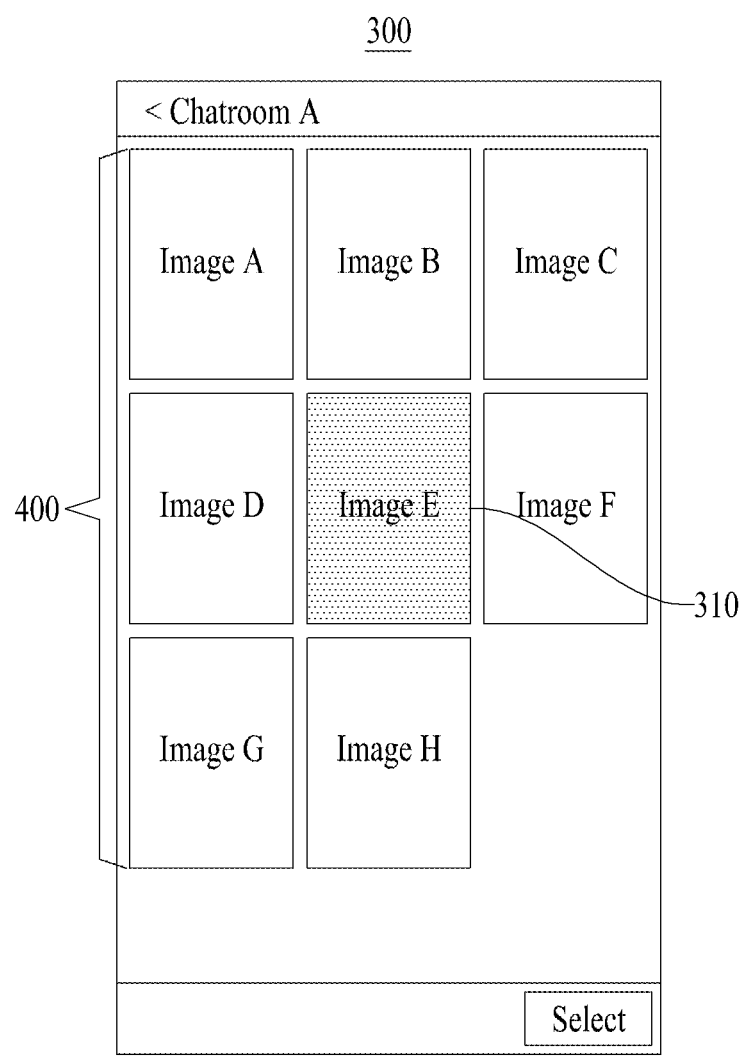

The messenger may include a function, for example, a content collection function and a content archive function, of providing a content list shared through a corresponding chatroom for each chatroom. Referring to FIG. 4, the chatroom A 300 may provide an image list 400 shared through the chatroom A 300 using a content collection function or a content archive function. Here, the user retrieves the desired image E 310 while verifying thumbnails included in the image list 400 one by one.

If a number of images shared in the chatroom A 300 increases, a search time may increase. Likewise, unless the user remembers the chatroom A 300, a relatively large amount of time and great effort may be needed for the user to retrieve the image E 310.

The example embodiments relate to enhancing an existing search function and retrieving multimedia content using a word included in a text-based chat message as a keyword.

The multimedia content used herein inclusively indicates any type of contents shared through the application, for example, image, video, emoticon, emoji, link, file, vote, or notification, other than a text-type chat message.

Example embodiments may provide a search function of including, as a search target, multimedia content shared on a messenger.

Figure 5:
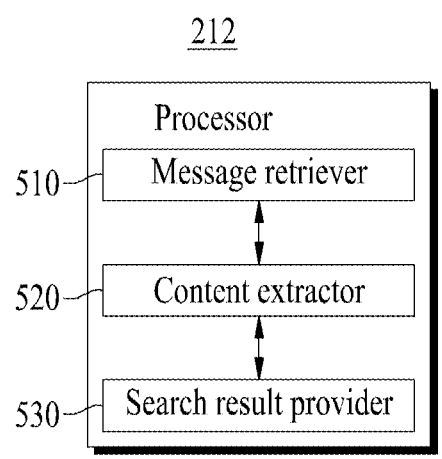
FIG. 5 is a diagram illustrating an example of a component includable in a processor of an electronic device according to at least one example embodiment.
Figure 6:
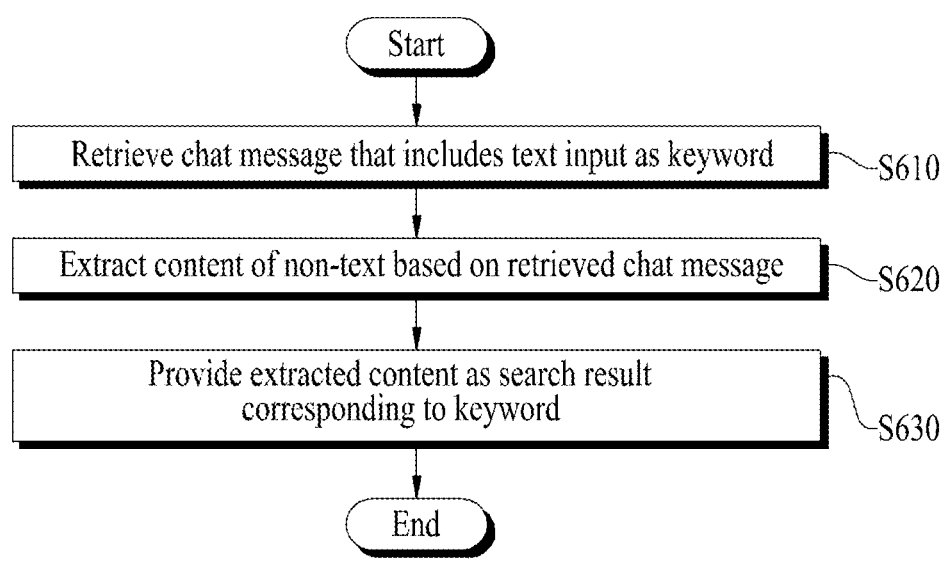
FIG. 6 is a flowchart illustrating an example of a method performed by an electronic device according to at least one example embodiment.

FIG. 5 is a diagram illustrating an example of a component includable in a processor of an electronic device according to at least one example embodiment, and FIG. 6 is a flowchart illustrating an example of a method performed by an electronic device according to at least one example embodiment A content search system implemented as a computer may be configured in the electronic device 110. For example, the content search system may be configured in a form of an independently operating program or in an in-app form of a specific application to be operable on the specific application. Depending on example embodiments, the content search system may provide a function of retrieving multimedia content from chat contents of a messenger through interaction with the server 150.

The content search system configured in the electronic device 110 may perform a content search method in response to an instruction provided from an application installed on the electronic device 110. To perform the content search method of FIG. 6, the processor 212 of the electronic device 110 may include a message retriever 510, a content extractor 520, and a search result provider 530 as shown in FIG. 5, as components. Also, depending on example embodiments, the components of the processor 212 may be separated or merged for functional representation of the processor 212.

The processor 212 and the components of the processor 212 may control the electronic device 110 to perform operations S610 to S630 included in the content search method of FIG. 6. For example, the processor 212 and the components of the processor 212 may be configured to execute an instruction according to a code of at least one program and a code of an OS included in the memory 211.

Here, the components of the processor 212 may be representations of different functions of the processor 212 that are performed by the processor 212 in response to an instruction provided from a program code stored in the electronic device 110, for example, an instruction provided from the application executed on the electronic device 110. For example, the message retriever 510 may be used as a functional representation of the processor 212 that controls the electronic device 110 to search for a chat message.

The processor 212 may read an instruction from the memory 211 to which instructions associated with control of the electronic device 110 are loaded. In this case, the read instruction may include an instruction to control the processor 212 to perform operations S610 to S630.

Referring to FIG. 6, in operation S610, the message retriever 510 may retrieve a chat message that includes a text input as a keyword from chat contents on the messenger installed on the electronic device 110. Through the messenger, data may be exchanged based on a message unit. Conversations (e.g., Chats) exchanged between a user and a counterpart may be classified into a text-type chat message and multimedia content corresponding to non-text content (e.g., image, video, emoticon, emoji, link, file, vote, and/or notification). The chat contents may be stored on a local database, for example, the memory 211, of the electronic device 110 in association with time information about a point in time at which corresponding chat content is exchanged and identification information of a corresponding chatroom. Here, the message retriever 510 may retrieve a chat message corresponding to the keyword from chat contents of a chatroom specified by the user of the electronic device 110. Also, the message retriever 510 may retrieve a chat message corresponding to a keyword from chat contents of the entire chatrooms instead of specifying a chatroom to be searched. When the user remembers chat content corresponding to a point in time at which content the user desires to retrieve is exchanged, the user may input a partial text of the chat content as a keyword. In response thereto, the message retriever 510 may retrieve a chat message that includes a text input as a keyword from among text-based chat messages.

In operation S620, the content extractor 520 may extract non-text content from the chat contents of the messenger based on the chat message (hereinafter, a reference message) retrieved in operation S610. Here, the chat message is a chat message including a text input as the keyword. The content extractor 520 may specify at least a portion of a chat section based on the reference message and may extract multimedia content present in the specified chat section. The content extractor 520 may extract the multimedia content in a chat section corresponding to at least one of previous and subsequent chats based on the reference message. For example, the content extractor 520 may extract a desired number of chats from among chats exchanged before and/or after a point in time at which the reference message is received and may extract multimedia content from a chat section corresponding to the extracted number of chats. For example, the content extractor 520 may extract ten previous chats and ten subsequent chats based on the reference message and may extract multimedia content present in the extracted 20 chats. As another example, the content extractor 520 may extract chats exchanged during at least one of previous and subsequent unit times based on time information of the reference message and may extract multimedia content from a chat section corresponding to the chats. For example, when the reference message is received at 9:00 am, the content extractor 520 may extract chats exchanged during 2 minutes between 1 minute before and 1 minute after 9:00 am, and may extract multimedia content present in the extracted chats. As another example, the content extractor 520 may specify a chat section from which multimedia content is to be extracted by combining a number of chats and a unit time. For example, when the number of chats exchanged during at least one unit time of previous and subsequent unit times based on time information of the reference message exceeds a threshold, the content extractor 520 may extract only a desired number of chats or may reduce a unit time in which a chat is extracted. On the contrary, when the number of chats exchanged during at least one unit time of previous and subsequent unit times based on the time information of the reference message is less than the threshold, the content extractor 520 may increase the number of chats to be extracted or may increase a unit time.

The chat section for extracting multimedia content is specified based on the reference message. Here, a criterion, for example, a previous chat/subsequent chat, a number of chats, and time, used to specify the chat section may be set by a messenger user or may be set as a predetermined (or, alternatively, desired) default value.

In operation S630, the search result provider 530 may provide a search result that includes the chat message (i.e., the reference message) including the keyword and the multimedia that is extracted from the partial chat section based on the reference message, in response to the keyword.

The search result provider 530 may provide the search result, for example, the reference message corresponding to the keyword, a list of multimedia contents, and corresponding transmission and reception time information. Here, the search result provider 530 may classify and thereby provide the reference message and the multimedia content included in the search result, and may classify and thereby provide the multimedia content for each content type (e.g., image, video, emoticon, emoji, link, file, vote, and/or notification). The search result provider 530 may provide the reference message and the multimedia content included in the search result, in a preview form. For example, when the multimedia content is an image or a video, the content result provider 530 may provide a preview by applying a thumbnail to the search result. In the preview form, the content result provider 530 may provide a corresponding image for an emoticon or an emoji, may provide an uniform resource locator (URL) address or corresponding webpage information for a link, may provide a file name for a file, and may provide a title for vote or notification.

Figure 7:
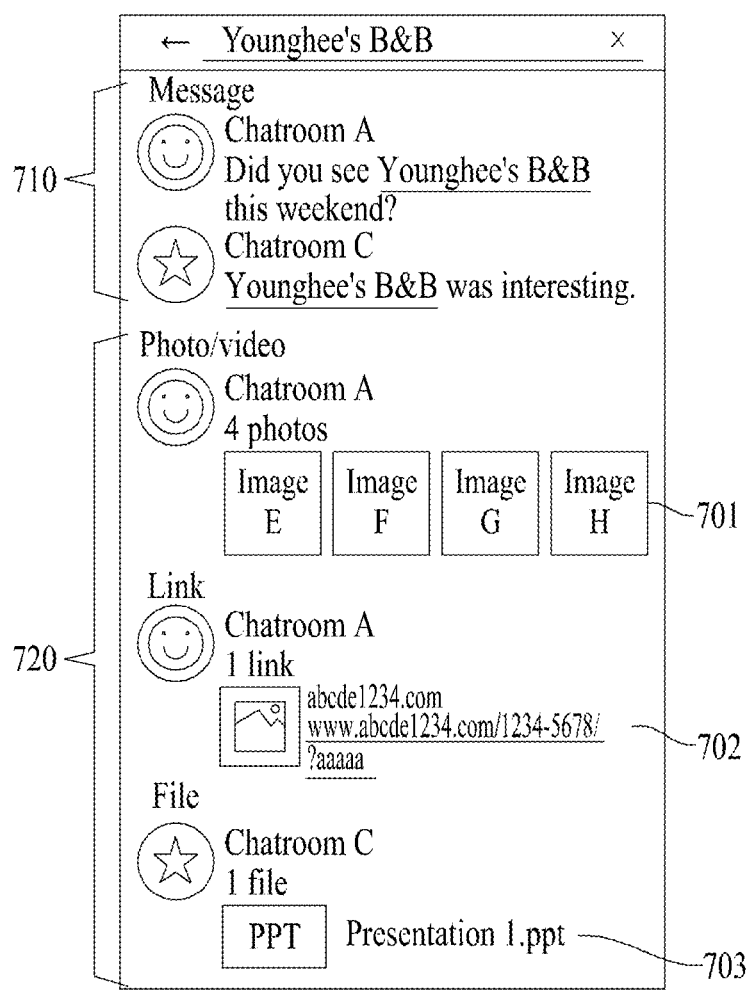
FIGS. 7 and 8 illustrate examples of a search result screen according to some example embodiments.
Figure 8:
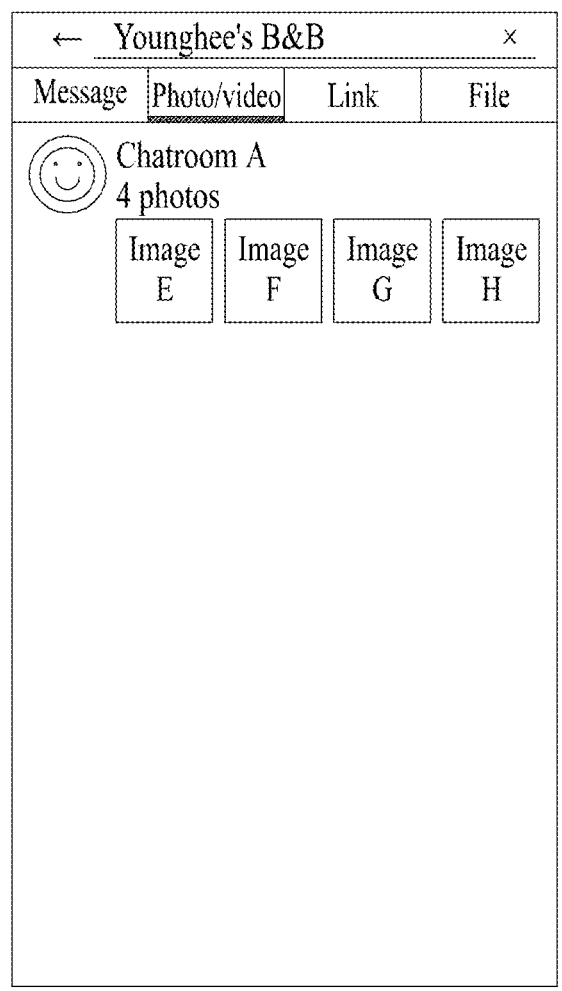

FIGS. 7 and 8 illustrate examples of a search result screen according to some example embodiments. FIGS. 7 and 8 illustrate examples of a search result screen about keyword "Younghee's B&B" retrieved from the entire chatrooms.

Referring to FIG. 7, a search result screen 700 includes a single page, for example, a single tab. A chat message (reference message) list 710 including "Younghee's B&B" and a multimedia content list 720 extracted from a partial chat section based on a reference message may be sorted on a single page.

At least a partial text of a chat message may be displayed on the cat message list 710. Here, "Younghee's B&B" included in the chat message may be displayed in highlight.

The multimedia content list 720 may be classified and thereby sorted for each content type (e.g., image, video, emoticon, emoji, link, file, vote, and/or notification).

Multimedia content may be displayed in a preview form in the multimedia content list 720. For example, in the case of an image or a video, a preview may be provided using a thumbnail 701. In the case of a link, a preview may be provided using a URL address 702. Also, in the case of a file, a preview may be provided using a file name 703.

As another example, referring to FIG. 8, the search result provider 530 may classify and thereby provide a chat message (reference message) list including "Younghee's B&B" and a multimedia content list extracted from a partial chat section based on a reference message through a search result screen 800 that is configured as a separate page for each message type. Referring to FIG. 8, the chat message list and the multimedia content list included in the search result may be displayed on individual pages. Here, the multimedia content may be classified for each content type and thereby displayed on an individual page.

Figure 9:
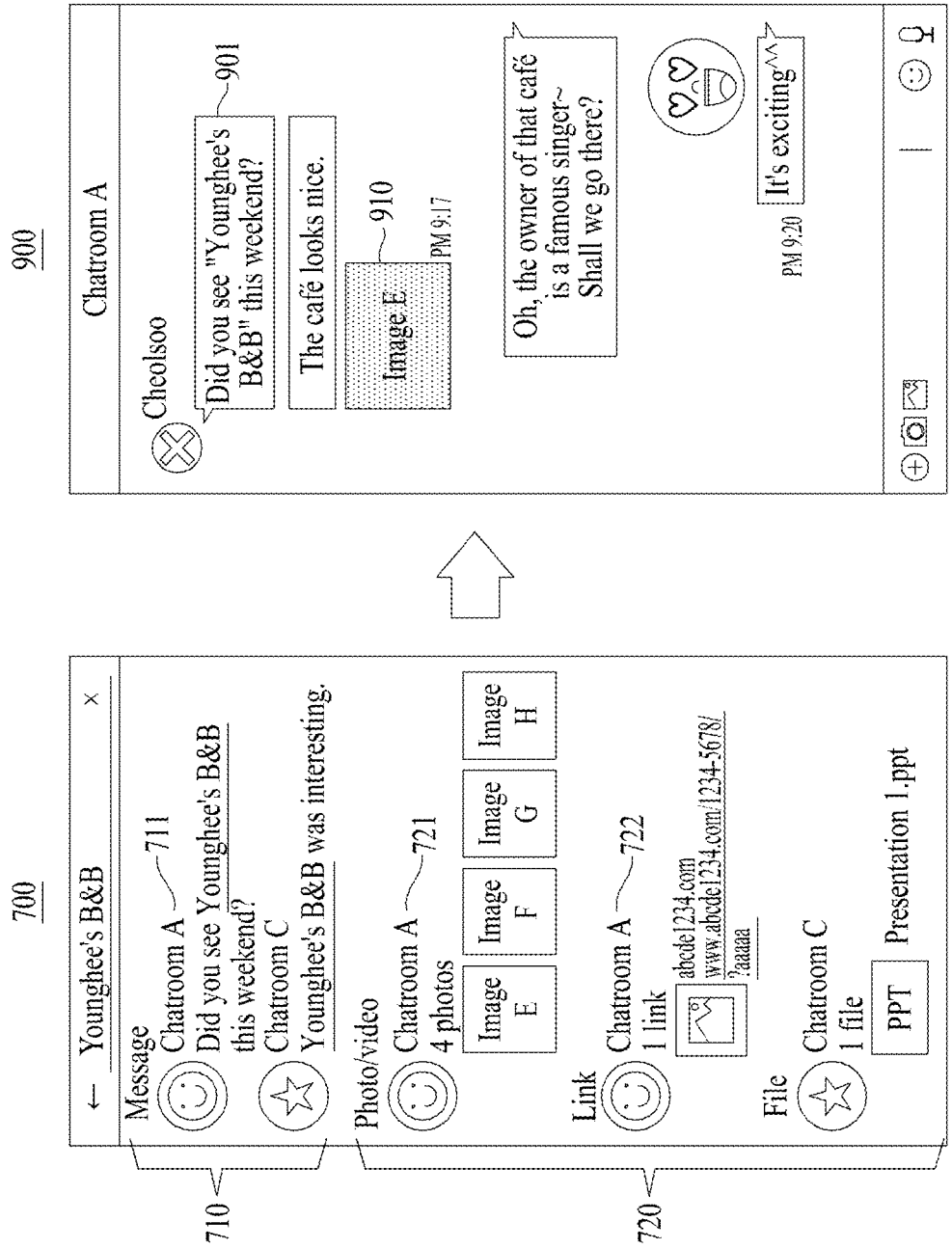
FIGS. 9 and 10 illustrate examples of a chatroom search process using a search result according to some example embodiments.
Figure 10:
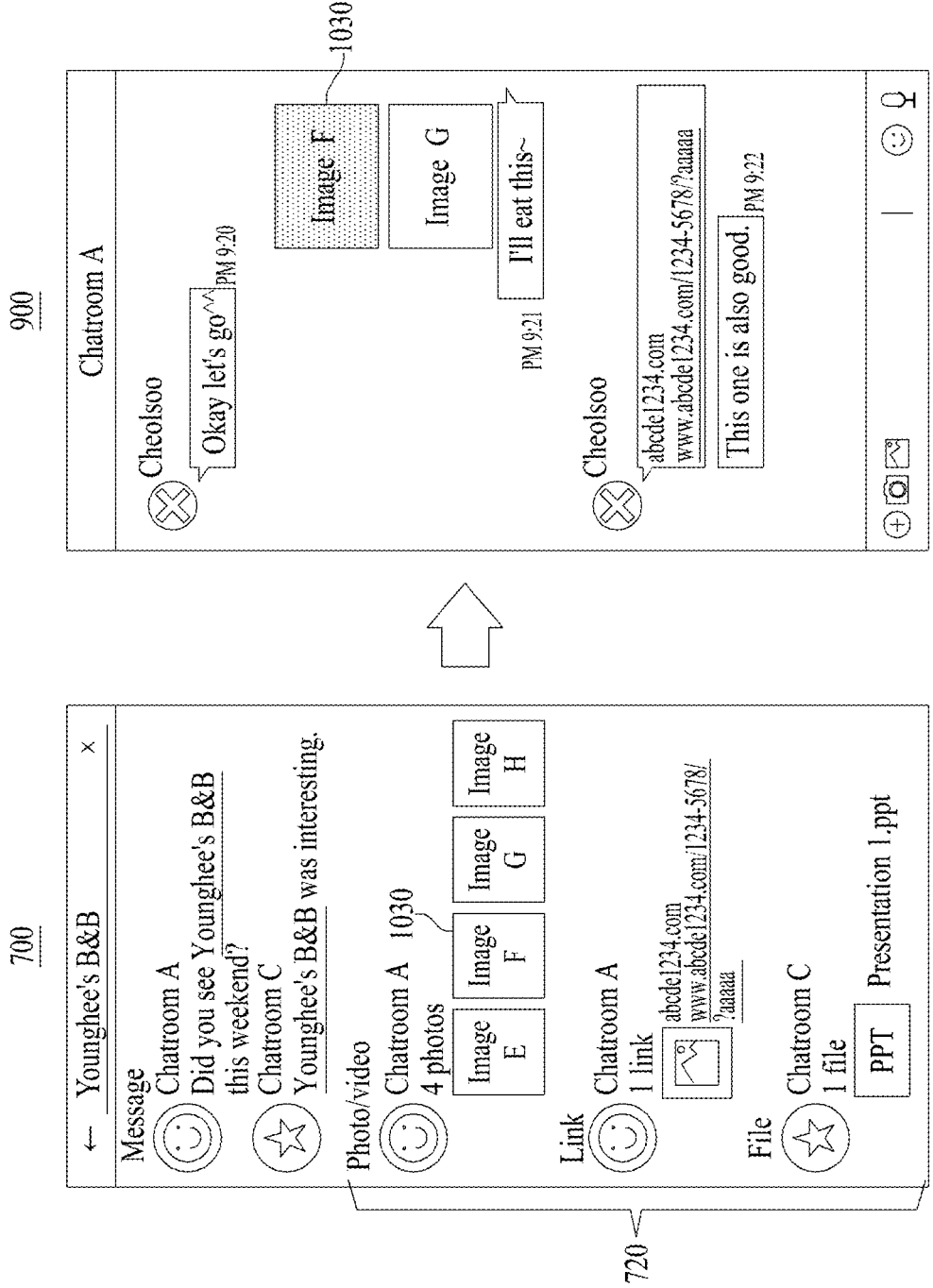

FIGS. 9 and 10 illustrate examples of a chatroom search process using a search result according to some example embodiments.

Referring to FIG. 9, in response to a selection on one of search result items 711, 721, and 722 associated with a "chatroom A" 900 from the chat message list 710 or the multimedia content list 720 displayed on the search result screen 700, the user may be directed to the chatroom A 900 including a chat message or multimedia content of the selected search result item.

When displaying the chatroom A 900 on a screen of the electronic device 110, the chatroom A 900 may be displayed at a location at which a reference message 901 that is a chat message including a keyword "Younghee's B&B" is present through an automatic scroll. Although a search result item included in the multimedia content list 720 is selected, the chatroom A 900 may be displayed on the screen through a scroll to the reference message 901 from which multimedia content of the selected search result item is extracted. As another example, when a search result item included in the multimedia content list 720 is selected, and in in this instance, a plurality of multimedia contents are included in the selected search result item, the chatroom A 900 may be displayed through a scroll to content corresponding to an earliest exchange time.

A process in which the user retrieves an image E 910 is assumed in FIG. 9.

When the user remembers that a conversation at a time of sharing the image E 910 is related to "Younghee's B&B", the user enters "Younghee's B&B" as a keyword through a search function. In response thereto, the search result provider 530 may provide a search result including the chat message list 710 and the multimedia content list 720 corresponding to the keyword "Younghee's B&B". The user may select a search result item through a preview provided as the search result and may enter the chatroom A 900 in which the image E 910 is shared.

As another example, referring to FIG. 10, in response to a selection on specific content 1030 from among search result items associated with the chatroom A 900 included in the multimedia content list 720, the user may be directed to the chatroom A 900 that includes the selected specific content 1030. Here, the chatroom A 900 may be displayed on the screen through an automatic scroll to a location at which the specific content 1030 is present.

Although it is described that the user is directed to a chatroom in which multimedia content is shared in response to a user selection on the multimedia content included in a search result, it is provided as an example only. The user may directly open the selected multimedia content on the electronic device 110.

Accordingly, a search function of a messenger according to example embodiments enables a user to retrieve not only text-based chat messages exchanged through a messenger and any of non-text contents.

According to example embodiments, it is possible to search for non-text content using a text in chat contents exchanged through a messenger. That is, a user may search for content being shared through an application by conducting a text search instead of directly scanning chat contents or a content list.

The systems and or apparatuses described herein may be implemented using hardware, and/or a combination of hardware and software. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to example embodiments may be recorded in non-transitory computer-readable record media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable record media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the present disclosure. Individual elements or features of a particular example embodiment are generally not limited to that particular embodiment, but, where applicable, are interchangeable and can be used in any selected example embodiment, even if not specifically shown or described. The same may also be varied in many ways. Such variations are not to be regarded as a departure from the disclosure, and all such modifications are intended to be included within the scope of the disclosure.

What is claimed is:

1. A method implemented by a computer system comprising at least one processor configured to execute computer-readable instructions included in a memory, the method comprising:

classifying, by the at least one processor, chat contents exchanged on a messenger into text-type chat messages and non-text contents;

storing, by the at least one processor, each of the classified chat contents in association with time information about a point in time of posting a corresponding chat content on a corresponding chatroom and identification information of the corresponding chatroom;

retrieving, by the at least one processor, a reference chat message that includes a keyword, from among the stored chat contents, in response to the keyword input from a user;

extracting, by the at least one processor, at least one of the non-text contents from a chat section specified based on the retrieved reference chat message; and providing, by the at least one processor, the extracted at least one of non-text contents as a search result corresponding to the keyword, wherein the extracting comprises, extracting a desired number of the chat contents exchanged during at least one unit time of previous or subsequent unit times based on the time information of the retrieved reference message, and extracting said at least one of the non-text contents from the extracted number of the chat contents as multimedia content.

2. The method of claim 1, wherein the extracting comprises:

specifying at least a portion of the chat section including some previous and subsequent chat contents based on the retrieved reference chat message; and extracting said at least one of the non-text contents from the specified chat section as multimedia content.

3. The method of claim 1, wherein the extracting comprises:

extracting a desired number of the chat contents from at least one previous chat content and at least one subsequent chat content based on the retrieved reference chat message; and extracting said at least one of the non-text contents from the extracted number of the chat contents as multimedia content.

4. The method of claim 1, wherein the extracting further comprises:

adjusting the at least one unit time based on the number of the chat contents exchanged during the at least one unit time.

5. The method of claim 1, wherein the providing comprises:

providing the search result that includes the retrieved reference chat message and the extracted non-text content.

6. The method of claim 5, wherein the providing comprises:

classifying and providing the retrieved reference chat message and the extracted non-text content included in the search result; and classifying and providing the extracted at least one of the non-text contents according to a content type thereof.

7. The method of claim 5, wherein the providing comprises:

providing the retrieved reference chat message and the non-text content included in the search result, in a preview form.

8. The method of claim 1, wherein the providing further comprises:

directing to a chatroom that includes one or more of the chat contents including the extracted non-text content, in response to a selection of the extracted non-text content included in the search result.

9. The method of claim 8, wherein the directing comprises:

displaying the chatroom at a location of the extracted non-text content or the reference chat message that is used as a criterion to extract said at least one of the non-text contents as the extracted at least one of the non-text contents, through an automatic scroll.

10. A non-transitory computer-readable record medium storing instructions that, when executed by at least one processor, cause the processor to perform a method, the method comprising:

classifying, by the at least one processor, chat contents exchanged on a messenger into text-type chat messages and non-text contents;

storing, by the at least one processor, each of the classified chat contents in association with time information about a point in time of posting a corresponding chat content on a corresponding chatroom and identification information of the corresponding chatroom;

retrieving, by the at least one processor, a reference chat message that includes a keyword, from among the stored chat contents, in response to the keyword input from a user;

extracting, by the at least one processor, at least one of the non-text contents from a chat section specified based on the retrieved reference chat message; and providing, by the at least one processor, the extracted at least one of non-text contents as a search result corresponding to the keyword, wherein the extracting comprises, extracting a desired number of the chat contents exchanged during at least one unit time of previous or subsequent unit times based on the time information of the retrieved reference chat message, and extracting said at least one of the non-text contents from the extracted number of the chat contents as multimedia content.

11. A computer system comprising: a memory; and at least one processor configured to connect to the memory and to execute computer-readable instructions included in the memory, the at least one processor configured to, classify chat contents exchanged on a messenger into text-type chat messages and non-text contents, store each of the classified chat contents in association with time information about a point in time of posting a corresponding chat content on a corresponding chatroom and identification information of the corresponding chatroom, retrieve a reference chat message that includes a keyword, from among the stored chat contents, in response to the keyword input from a user, extract at least one of the non-text contents from a chat section specified based on the retrieved reference chat message, and provide the extracted at least one of non-text contents as a search result corresponding to the keyword, wherein the at least one processor is configured to extract the one of the non-text contents by, extracting a desired number of the chat contents exchanged during at least one unit time of previous or subsequent unit times based on the time information of the retrieved reference chat message, and extracting said at least one of the non-text contents from the extracted number of the chat contents as multimedia content.

12. The computer system of claim 11, wherein the at least one processor is configured to, specify at least a portion of the chat section including some previous and subsequent chats based on the received reference chat message, and extract said at least one of the non-text contents from the specified chat section as multimedia content.

13. The computer system of claim 11, wherein the at least one processor is configured to,
- extract a desired number of the chat contents from at least one previous chat content and at least one subsequent chat content based on the retrieved reference chat message, and
- extract said at least one of the non-text contents from the number of the extracted chat contents as multimedia content.

14. The computer system of claim 11, wherein the at least one processor is further configured to adjust the at least one unit time based on the number of the chat contents exchanged during the at least one unit time.

15. The computer system of claim 11, wherein the at least one processor is configured to provide the search result that includes the retrieved reference chat message and the extracted non-text content.

16. The computer system of claim 15, wherein the at least one processor is configured to,
- classify and provide the retrieved reference chat message and the extracted non-text content included in the search result, and
- classify and provide the extracted at least one of non-text contents according to a content type thereof.

17. The computer system of claim 15, wherein the at least one processor is configured to provide the retrieved reference chat message and the extracted at least one of non-text contents included in the search result, in a preview form.

18. The computer system of claim 11, wherein the at least one processor is configured to,
- direct to a chatroom that includes one or more of the chat contents including the extracted at least one of the non-text contents, in response to a selection of the extracted at least one of the non-text contents included in the search result, and
- display the chatroom at a location of the extracted at least one of the non-text contents or the reference chat message that is used as a criterion to extract said at least one of the non-text contents as the extracted at least one of the non-text contents, through an automatic scroll.

* * * * *